US008744353B2

(12) United States Patent
Hsieh

(10) Patent No.: US 8,744,353 B2
(45) Date of Patent: Jun. 3, 2014

(54) BLUETOOTH MOUSE FOR FAST SWITCHING LINKING OBJECTS

(75) Inventor: Yu-Chun Hsieh, New Taipei (TW)

(73) Assignee: Zippy Technology Corp., New Taipei (TW)

( * ) Notice: Subject to any disclaimer, the term of this patent is extended or adjusted under 35 U.S.C. 154(b) by 394 days.

(21) Appl. No.: 13/049,471

(22) Filed: Mar. 16, 2011

(65) Prior Publication Data

US 2011/0256831 A1 Oct. 20, 2011

(30) Foreign Application Priority Data

Apr. 19, 2010 (TW) ................................ 99112112 A

(51) Int. Cl.
*H04W 4/08* (2009.01)
*G06F 3/038* (2013.01)
*G06F 3/0354* (2013.01)

(52) U.S. Cl.
CPC ............ *G06F 3/038* (2013.01); *G06F 3/03543* (2013.01); *G06F 2203/0384* (2013.01)
USPC .............................. 455/41.2; 455/41.3; 710/36

(58) Field of Classification Search
USPC ................. 455/41.2, 41.3, 556.2, 420, 422.1; 345/156, 169, 168, 163, 164, 172, 2.1; 348/734; 710/36, 62, 72; 463/37
See application file for complete search history.

(56) References Cited

U.S. PATENT DOCUMENTS

| 7,162,232 | B2 * | 1/2007 | Ramakesavan et al. ....... 455/420 |
| 7,664,894 | B2 * | 2/2010 | Grushkevich ................... 710/62 |
| 7,715,794 | B2 * | 5/2010 | Hulvey ......................... 455/41.2 |
| 2005/0289225 | A1 * | 12/2005 | Zhuang et al. ................ 709/208 |
| 2007/0150560 | A1 * | 6/2007 | Zhang et al. .................. 709/220 |
| 2008/0274695 | A1 * | 11/2008 | Muth ........................... 455/41.2 |
| 2010/0079681 | A1 * | 4/2010 | Coburn et al. ................ 348/734 |
| 2010/0225589 | A1 * | 9/2010 | Hsieh ............................ 345/168 |
| 2012/0040617 | A1 * | 2/2012 | Hsia et al. ..................... 455/41.3 |

FOREIGN PATENT DOCUMENTS

| TW | M341266 | 9/2008 |
| TW | 200846976 | 12/2008 |
| TW | 3155578 | 11/2009 |

* cited by examiner

*Primary Examiner* — Edward Urban
*Assistant Examiner* — Ralph H Justus
(74) *Attorney, Agent, or Firm* — Muncy, Geissler, Olds & Lowe, P.C.

(57) ABSTRACT

A Bluetooth mouse for fast switching linking objects comprises a signal processing circuit triggered by a key unit to generate a control signal according to a displacement amount of the mouse. The signal processing circuit is electrically connected with a Bluetooth transmission device. The mouse has a pairing information memory storing pairing codes for establishing data transmission linkages between the Bluetooth transmission device and at least one information processing systems. The key unit is programmed one key or a combination of the keys to trigger the signal processing circuit to generate an object-switching signal. The object-switching signal drives the Bluetooth transmission device to access one pairing code from the pairing information memory according to the displacement amount of the mouse, and establishes a data transmission linkage with one information processing system corresponding to the pairing code.

7 Claims, 8 Drawing Sheets

BLUETOOTH MOUSE FOR FAST SWITCHING LINKING OBJECTS

FIELD OF THE INVENTION

The present invention relates to a Bluetooth mouse for fast switching linking objects and particularly to a Bluetooth mouse to determine the object desired to be linked by detecting the movement of the mouse.

BACKGROUND OF THE INVENTION

Information processing systems, such as desktop computers, portable computers, intelligent mobile phones, etc., have been popular in people's daily life, and people can use them for work, entertainment, Internet-access, or even remote communication. With reduced cost of information processing systems after popularization, a user may possess several information processing systems. Generally, the user uses an external input device to input data into an information processing system. The above-mentioned input device may be a keyboard, a mouse or a game controller. In order to facilitate using of the above-mentioned input device and solve the problem of limited moving range of the cable, the conventional wired transmission is evolved into wireless transmission. As this kind of input device has limited data transmission amount and volume, the infrared technology or the Bluetooth technology is adopted for wireless transmission of the input device. However, the infrared transmission is limited by distance and receiving direction, thus an infrared mouse has limited operating area. Because the Bluetooth mouse is less limited in receiving direction and has lower power consumption, it is more promising than the infrared mouse. Hence, many electronic products have adopted the Bluetooth technology for wireless communication. A R.O.C. publication No. 200846976 discloses a related technology entitled "Bluetooth Data Transmission Device and Method Thereof" including a mouse, a keyboard or a touch panel, and a first Bluetooth element for transmitting data to a computer electrically connected with a second Bluetooth element. The prior art uses a mouse or a keyboard to transmit commands to a computer via the Bluetooth technology.

A R.O.C. patent No. M341266 discloses a related technology entitled "Keys and Keyboard", which uses a conductive plate as a part of an antenna. The conductive plate is boned to or clamped below a keycap of a key. As the key containing a part of an antenna, it is not only equipped with the Bluetooth transmission function, but also saves space.

Although the Bluetooth keyboard is superior to the infrared keyboard, the conventional Bluetooth keyboard merely focuses on one-to-one wireless transmission between the keyboard and a single device but not selecting different linking devices, and lacks a fast linkage-switching technology. At present, the Bluetooth transmission device has to search for linkable devices once again in each linking process.

It is more troublesome to use a mouse adopting the Bluetooth technology. A mouse is unable to display the linkable devices. Therefore, when the user intends to establish a linkage between a Bluetooth mouse and a computer, he/she has to execute "Linkage Addition" function to choose the Bluetooth mouse at the computer end. When the user intends to link the same Bluetooth mouse to another computer, he still has to execute the "Linkage Addition" function to choose the Bluetooth mouse at another computer end. It is obvious that if a computer is not equipped with a mouse, it is difficult to operate the computer. Therefore, it is very troublesome to execute the "Linkage Addition" function before the Bluetooth mouse is linked to the computer.

In order to overcome the above-mentioned problems, the Applicant has filed an application entitled "Input Device with Multi-object Switch Transmission" in Japan utility model No. 3155578. Refer to FIG. 1 for the prior art, an input device 2 and multiple information processing systems 1 respectively having a Bluetooth transmission device 3 are provided (in this prior art, the Bluetooth transmission devices at two sides are respectively denoted by 31 and 32). The input device 2 includes a plurality of device identification codes (Bd_address) and device authorization codes (link key) stored therein and linked to the information processing devices 1, which are necessary for bidirectional data transmission. Thereby, the input device 2 needn't search for and establish linking data once again when switching the linking objects.

The Japan prior art can be applied to a Bluetooth keyboard or a Bluetooth mouse. In practice, the user can choose one of the linking objects via using the keyboard or the mouse. The keyboard has sufficient space to accommodate extra keys. Alternatively, different combinations of the keys can be used to execute the selection function. However, the mouse does not have sufficient space to accommodate extra keys or execute the selection function through different combinations of keys. Therefore, the conventional Bluetooth mouse still leaves a lot to be improved to actually achieve fast switching linking function among several computers.

SUMMARY OF THE INVENTION

In view of the structural limitation in the conventional Bluetooth mouse and the inconvenient linkage switching among several systems, the objective of the present invention is to provide a mouse for fast switching linking objects among several information processing systems.

The present invention proposes a Bluetooth mouse for fast switching linking objects, which comprises a signal processing circuit triggered by a key unit to generate a control signal sending to an information processing system according to the displacement amount of the mouse. The signal processing circuit is electrically connected with a Bluetooth transmission device. The Bluetooth mouse contains a pairing information memory storing pairing codes for establishing data transmission linkages between the Bluetooth transmission device and at least one information processing system. The key unit sets one key or a combination of keys to trigger the signal processing circuit to generate an object-switching signal. The object-switching signal drives the Bluetooth transmission device to access a pairing code from the pairing information memory according to the displacement amount of the Bluetooth mouse to establish a data transmission linkage with an information processing system corresponding to the pairing code and transmit the control signal to the linked information processing system.

Via the above-mentioned technology, the Bluetooth mouse can store a plurality of pairing codes for linking to different information processing systems. The user can choose a pairing code to fast link to the corresponding information processing system.

DETAILED DESCRIPTION OF THE PREFERRED EMBODIMENTS

Figure 1:
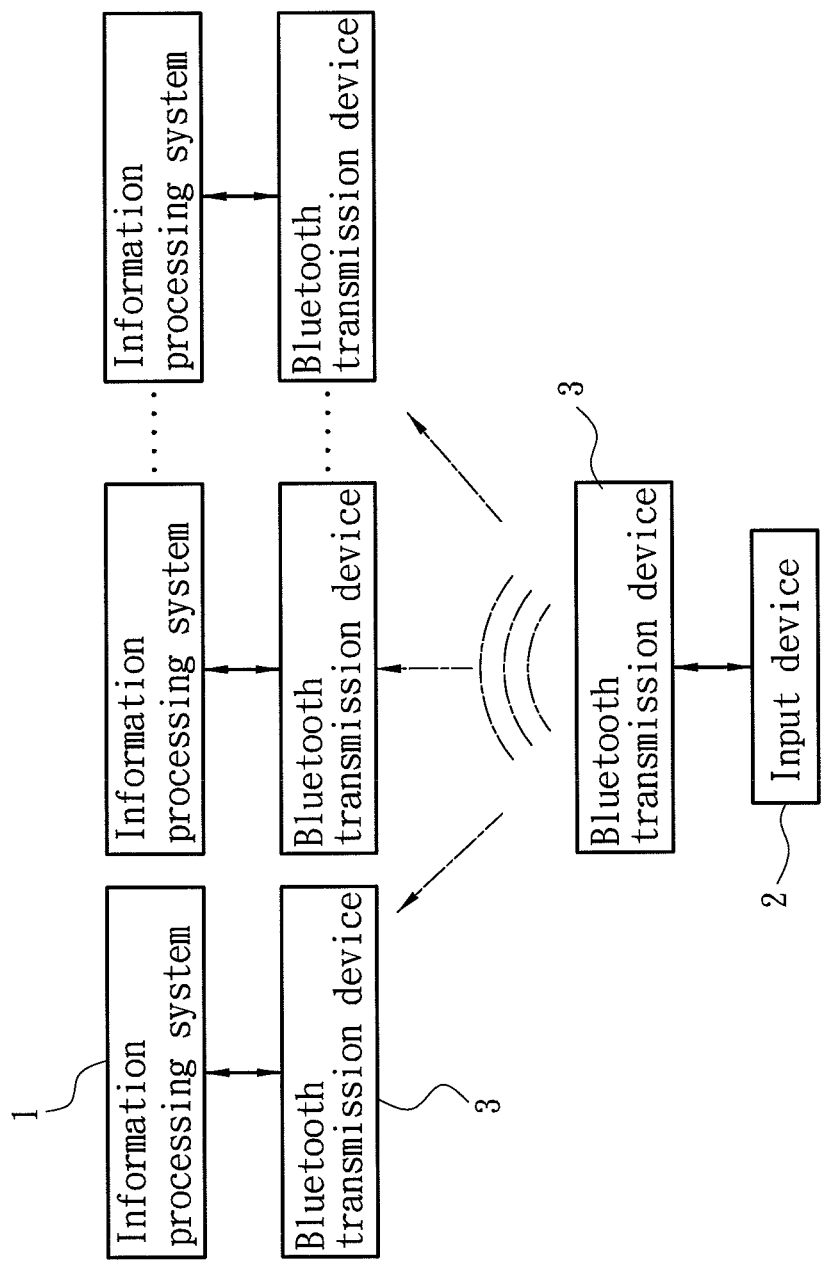
FIG. 1 is a block diagram schematically showing a conventional Bluetooth mouse.
Figure 2:
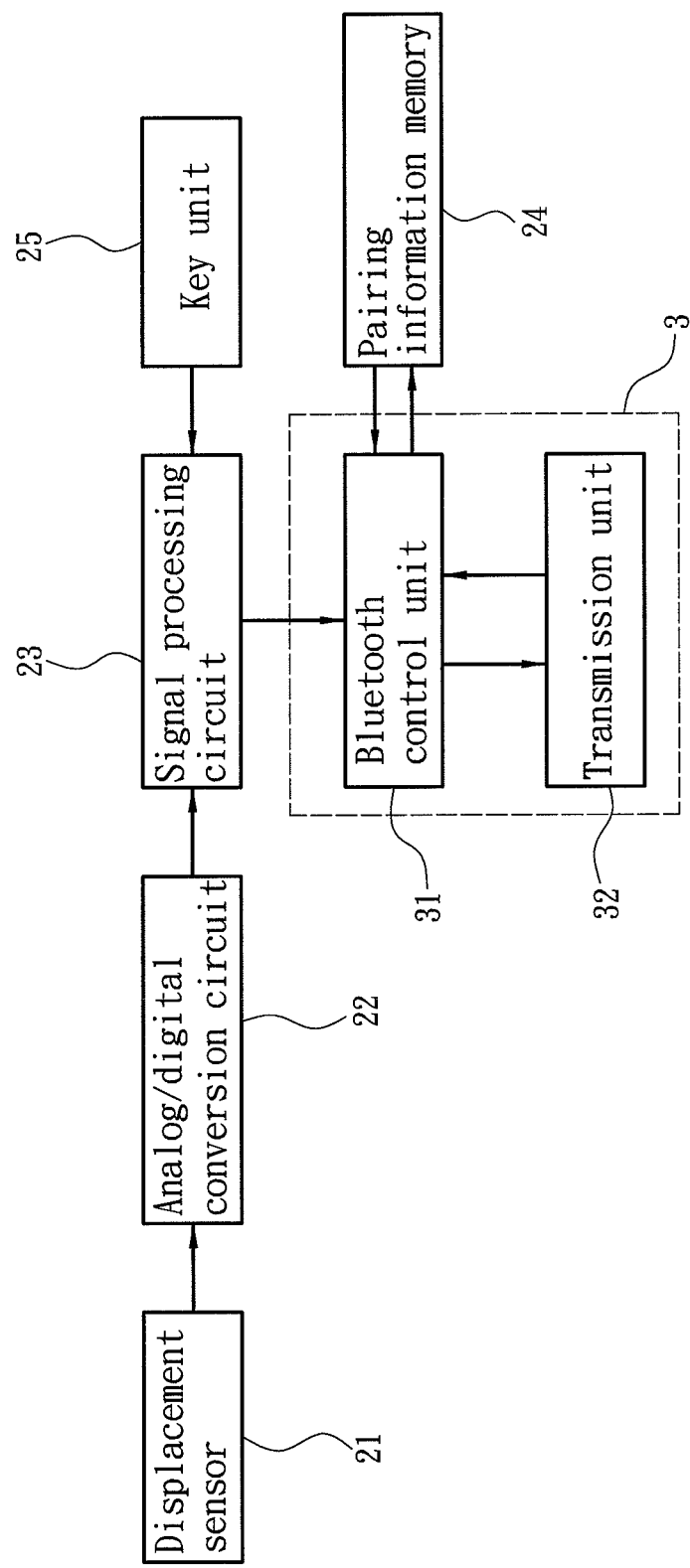
FIG. 2 is a block diagram schematically showing a Bluetooth mouse according to one embodiment of the present invention.
Figure 6:
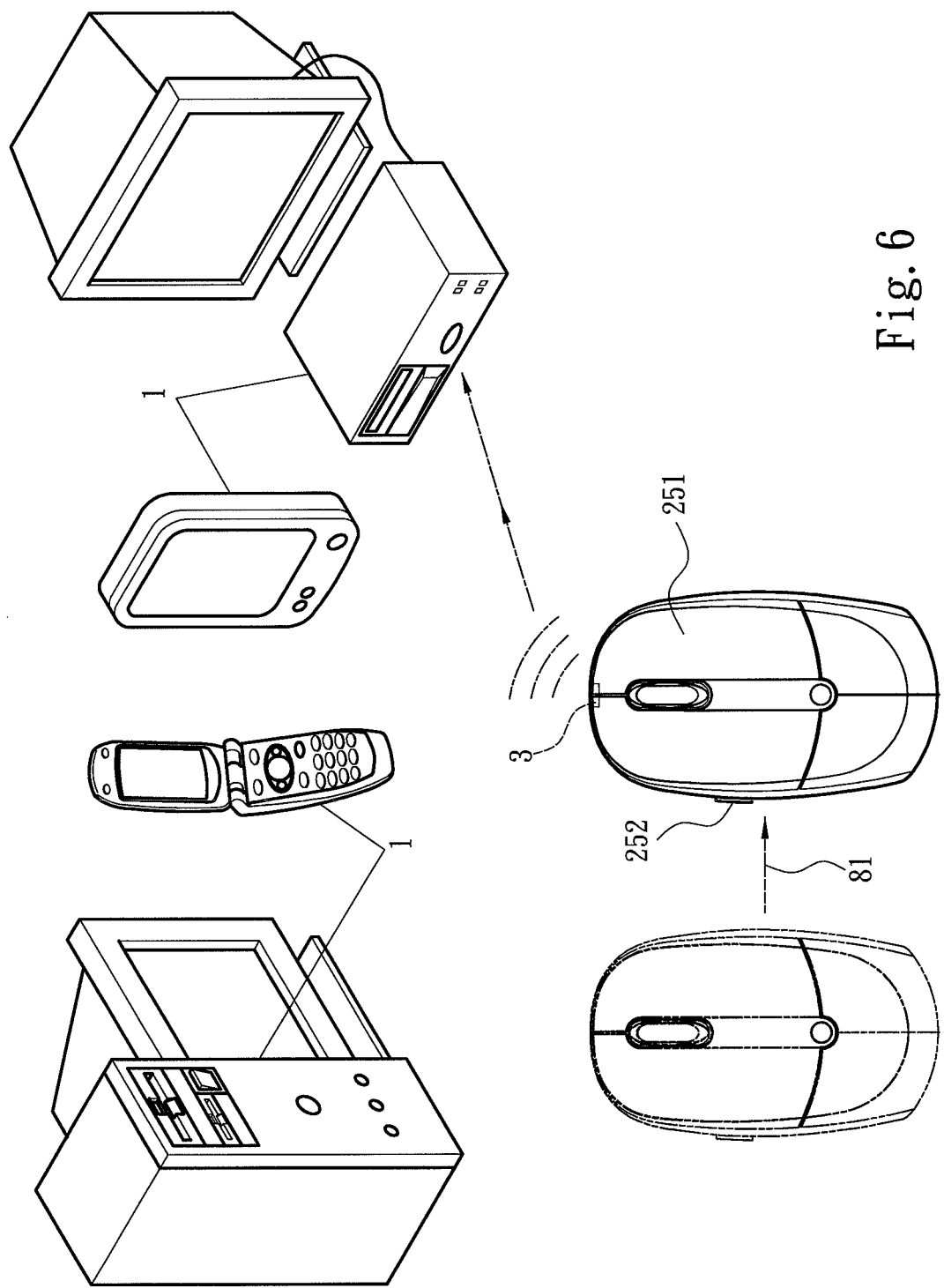
FIG. 6 is a schematic view showing a Bluetooth mouse for switching linking objects according to one embodiment of the present invention.

Refer to FIG. 2. The present invention proposes a Bluetooth mouse for fast switching linking objects, which comprises a displacement sensor 21, an analog/digital conversion circuit 22 electrically connected with the displacement sensor 21, a key unit 25 and a signal processing circuit 23. The displacement sensor 21 is used to detect the displacement amount of the Bluetooth mouse and may be an optical sensor, a rolling sensor, or an inertia sensor. The analog/digital conversion circuit 22 converts the displacement amount detected by the displacement sensor 21 into a displacement amount signal and sends the displacement amount signal to the signal processing circuit 23. The analog/digital conversion circuit 22 is optional. If the displacement sensor 21 outputs digital signals, the analog/digital conversion circuit 22 can be omitted. The user presses the key unit 25 to generate a corresponding electrical signal. The signal processing circuit 23 generates a control signal according to the displacement amount of the Bluetooth mouse and the electrical signal triggered by the signal processing circuit 23. The control signal is exactly the command input by the user via the mouse and sent to an information processing system 1 (as shown in FIG. 6). In order to transmit the control signal via the Bluetooth transmission technology, the signal processing circuit 23 is further electrically connected with a Bluetooth transmission device 3. The Bluetooth transmission device 3 is preferably installed in the mouse. The Bluetooth mouse further has a pairing information memory 24, which stores pairing codes for establishing data transmission linkages between the Bluetooth transmission device 3 and at least one information processing system 1. The pairing code includes a device identification code (Bd_address) and a device authorization code (link key), which are necessary for bidirectional data transmission. The Bluetooth transmission device 3 can establish linkages with a plurality of different information processing systems 1. The Bluetooth transmission device 3 stores the information (is called the pairing codes in the present invention) necessary for linkages with the information processing systems 1 into the pairing information memory 24. The pairing codes in the pairing information memory 24 can be written into or accessed to increase or decrease the number of the linkable information processing systems 1. The Bluetooth transmission device 3 includes a Bluetooth control unit 31 and a transmission unit 32. The Bluetooth control unit 31 modulates the signal having a signal format conforming to the Bluetooth specification. The transmission unit 32 sends out the signal. The Bluetooth control unit 31 also controls the objects for establishing transmission linkage. One key or a combination of several keys in the key unit 25 is set to trigger the signal processing circuit 23 to generate an object-switching signal. The object-switching signal drives the Bluetooth control unit 31 of the Bluetooth transmission device 3 into a linkage-switching mode. In the linkage-switching mode, the user moves the Bluetooth mouse, and the Bluetooth control unit 31 obtains the displacement amount from the signal processing circuit 23. The Bluetooth control unit 31 accesses a pairing code from the pairing information memory 24 according to the displacement amount and establishes a data transmission linkage with an information processing system 1 corresponding to the pairing code. Thereby, the Bluetooth mouse can determine the linking object according to its own displacement amount when the signal processing circuit 23 generates the object-switching signal.

Figure 3:
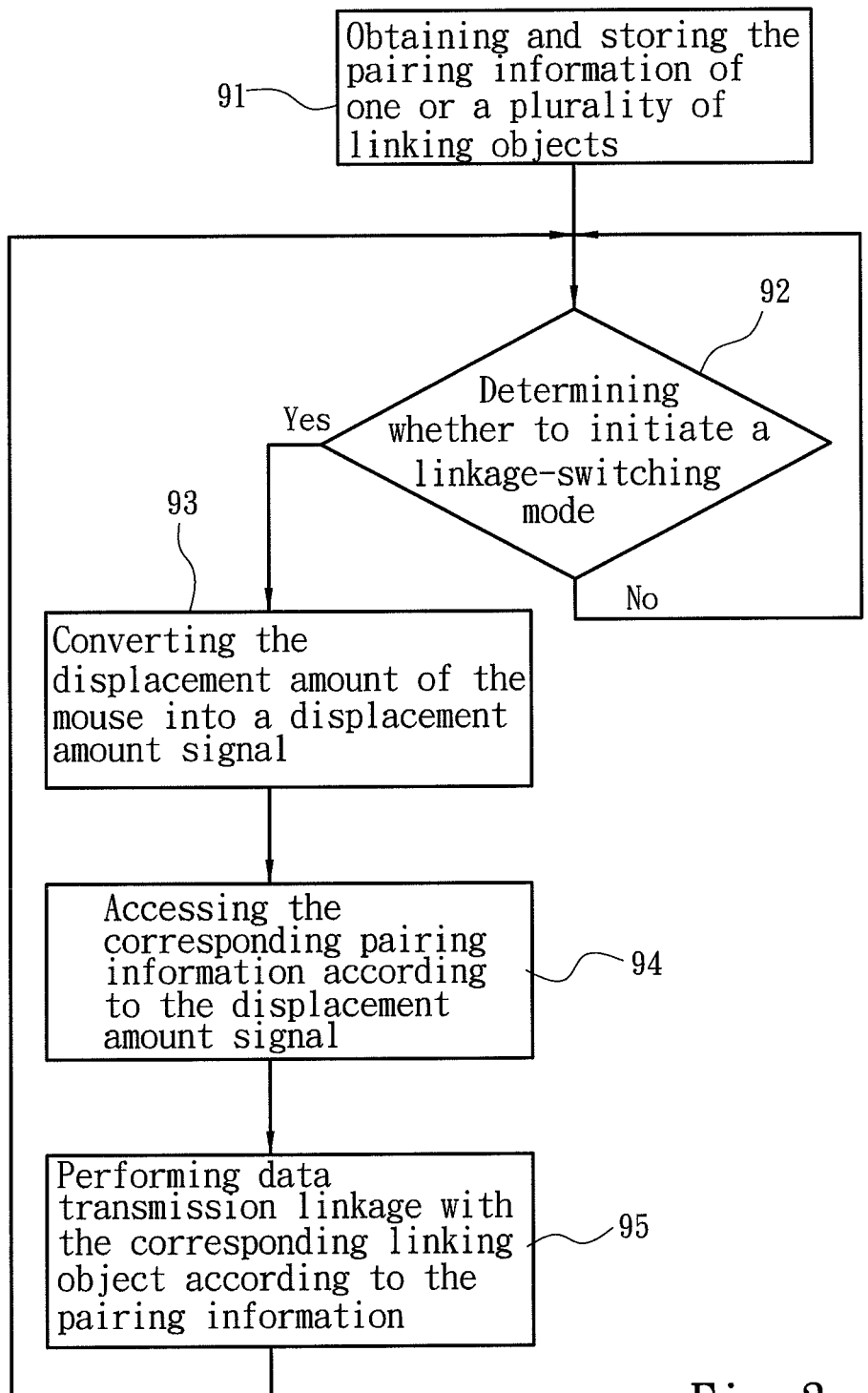
FIG. 3 is a flowchart of an operation process of a Bluetooth mouse according to one embodiment of the present invention.
Figure 4:
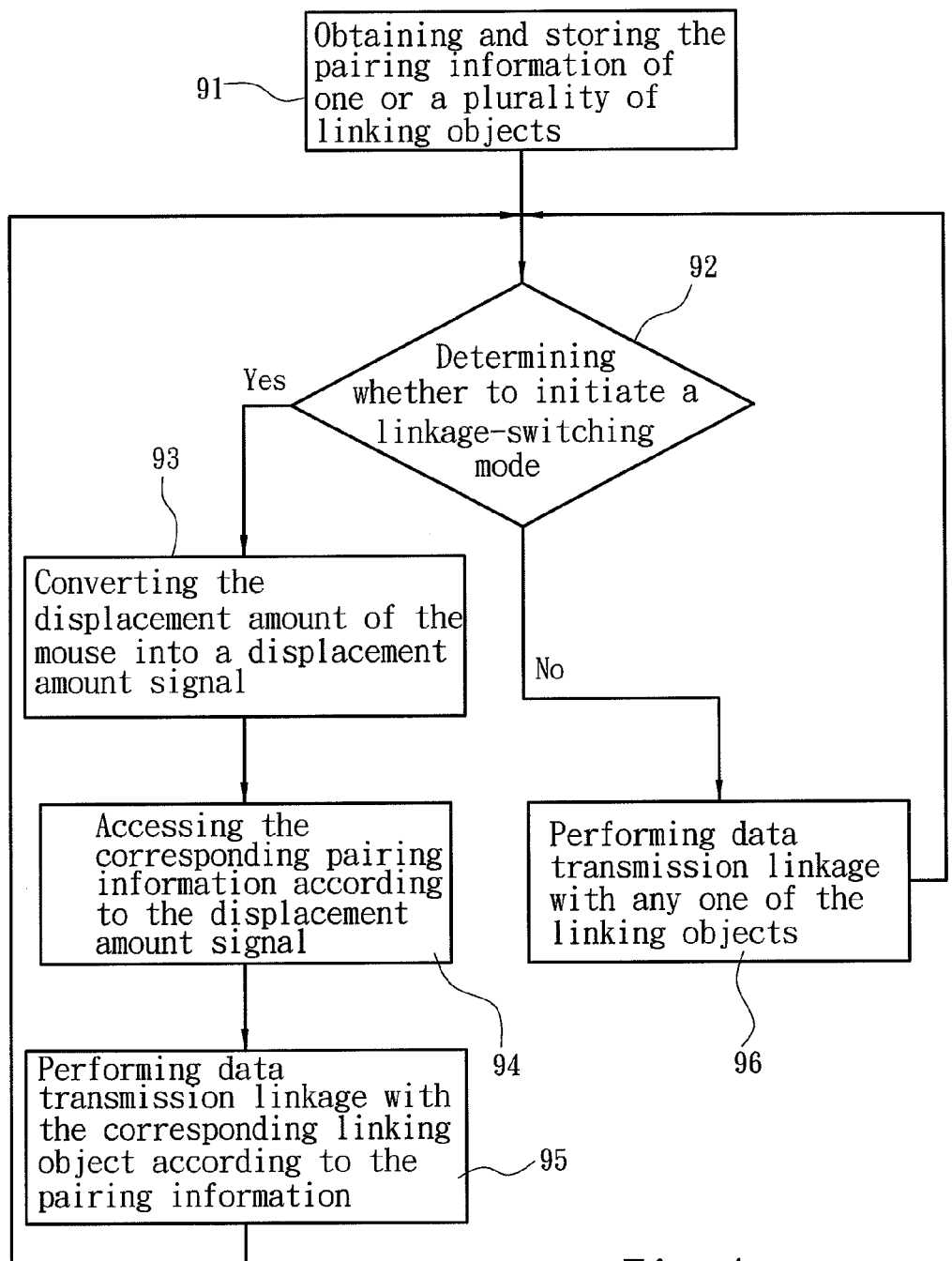
FIG. 4 is a flowchart of an operation process of a Bluetooth mouse according to another embodiment of the present invention.

Refer to FIG. 3 a flowchart of switching the linking objects by the Bluetooth mouse. First, the Bluetooth mouse obtains and stores the pairing information of one or a plurality of linking objects (Step 91), whereby the mouse has the ability to fast establish data transmission linkage with one or more linking objects. Next, the Bluetooth mouse determines whether to initiate a linkage-switching mode (Step 92). If the Bluetooth mouse does not initiate the linkage-switching mode, it keeps waiting for the user's instruction to initiate the linkage-switching mode. If the user instructs the Bluetooth mouse to initiate the linkage-switching mode, the process proceeds to Step 93. In Step 93, the Bluetooth mouse waits for the user to move it to generate displacement amount, and the displacement amount is then converted into a displacement amount signal. Next, the Bluetooth control unit 31 accesses corresponding pairing information from the pairing information memory 24 according to the displacement amount signal (Step 94). Finally, the Bluetooth control unit 31 performs data transmission with a corresponding linking object according to the pairing information. Thereby, the Bluetooth mouse transmits the control signal input by the user to the selected linking object. Meanwhile, the Bluetooth mouse persistently examines whether the user initiates the linkage-switching mode again to change the linking object. Refer to FIG. 4 another flowchart. The process in FIG. 4 is different from the process in FIG. 3 in when it is to determine whether the user initiates the linkage-switching mode (Step 92), if the user does not initiate the linkage-switching mode, the Bluetooth mouse can perform data transmission with any one of the linkable objects (Step 96). In such a case, the linking object may be the one used last time or a preset one. The preset linking object may be written into the driving program of the Bluetooth mouse or programmed by the user with software before the linkage-switching mode is executed.

Figure 5:
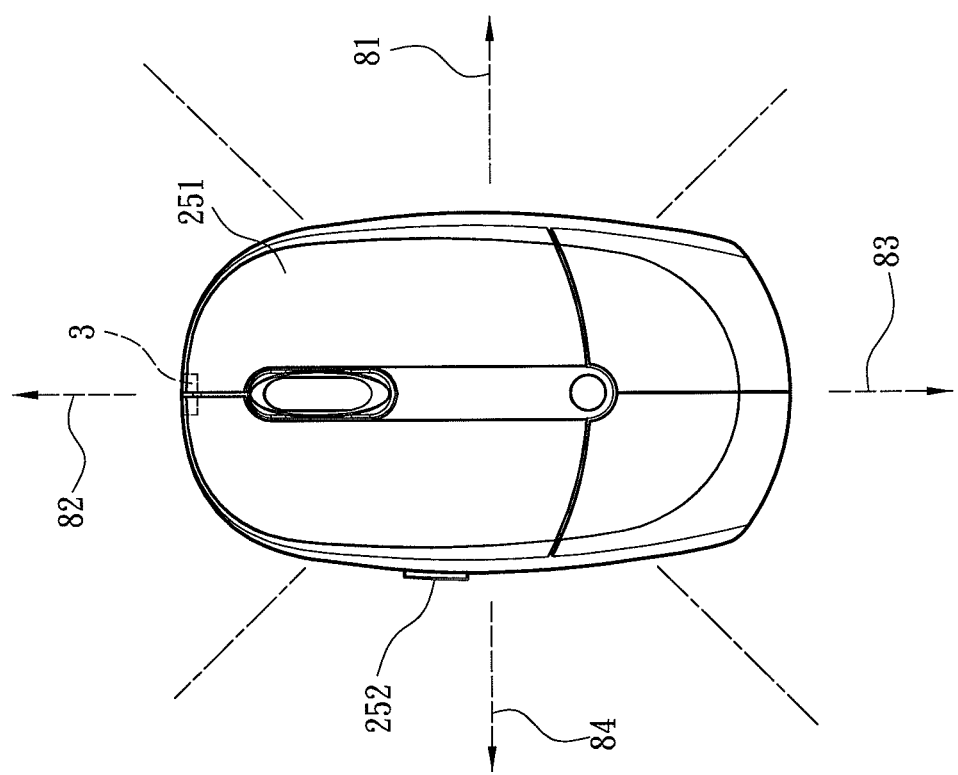
FIG. 5 is a schematic view showing a Bluetooth mouse for identifying multiple moving directions according to one embodiment of the present invention.
Figure 7:
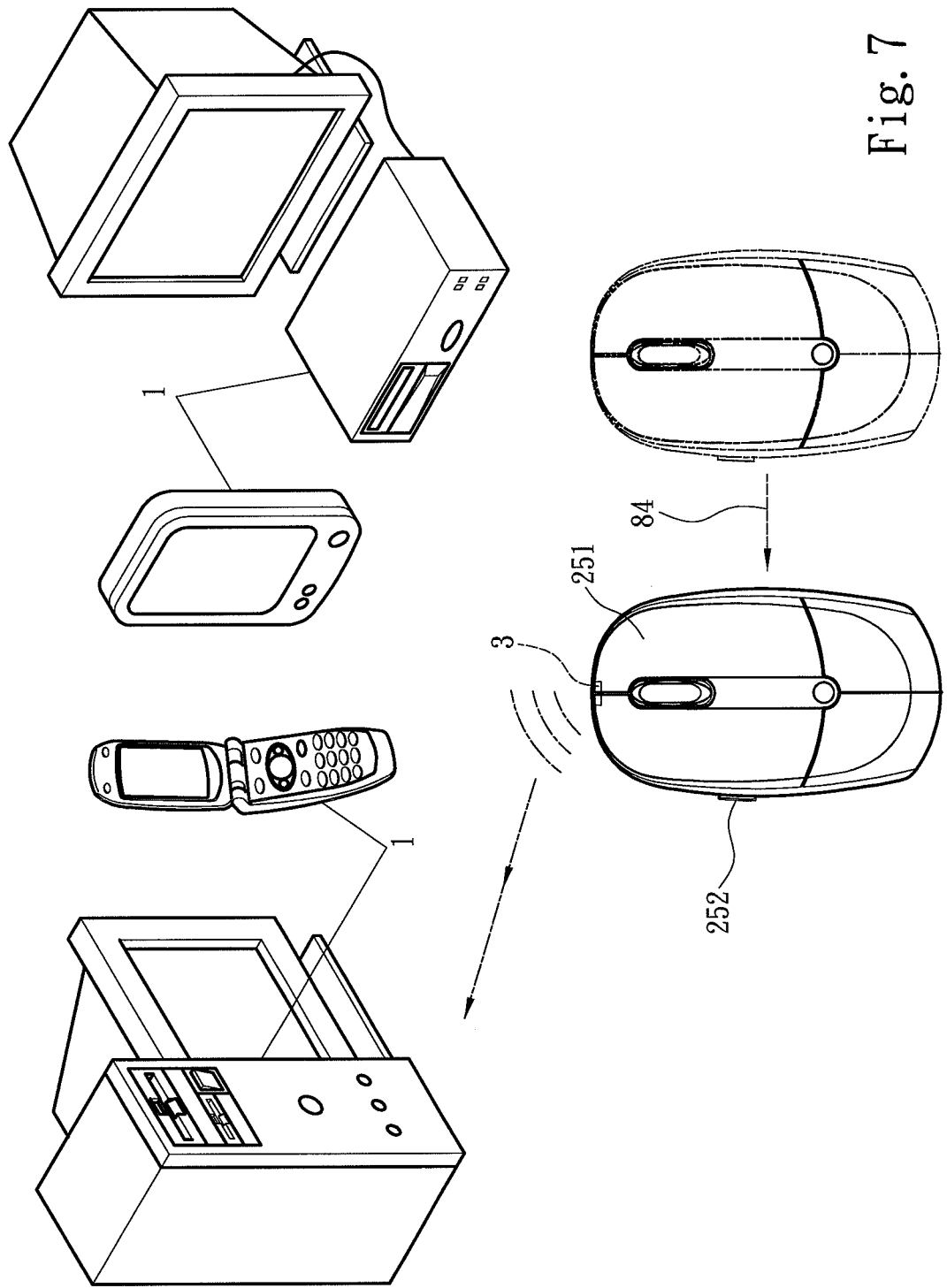
FIG. 7 is a schematic view showing a Bluetooth mouse for switching linking objects according to another embodiment of the present invention.

Refer to FIG. 5, FIG. 6 and FIG. 7. The signal processing circuit 23 may divide the plane where the Bluetooth mouse moves into a plurality of displacement sections and generates different displacement amount signals when the mouse moves on the displacement sections. As shown in FIG. 5, the plane where the Bluetooth mouse moves is divided into four displacement sections, and the four displacement sections pointed by displacement directions 81, 82, 83 and 84 are recognized as four different displacement amount signals. Each displacement amount signal is solely corresponding to a pairing code in the pairing information memory 24. For instance, if the user moves the Bluetooth mouse forward (along the displacement direction 82), even the moving direction is not completely straight forward, the direction can still be recognized as long as the Bluetooth mouse is moved within the permitted section. Then, the recognized direction is converted into a corresponding displacement amount signal.

When the Bluetooth mouse is moved rightward (along the displacement direction 81), another different displacement amount signal is generated. The above-mentioned recognition process can also be realized by the driving program of the Bluetooth mouse. If the plane where the Bluetooth mouse moves is defined as an X-Y coordinate system, the displacement amounts of the Bluetooth mouse are respectively $\Delta X$ and $\Delta Y$. Suppose that $\Delta X$ is greater than $\Delta Y$, the movement of the Bluetooth mouse is regarded as moving toward the displacement direction 81. Other suppositions of $\Delta X$ and $\Delta Y$ are analogized likewise. Refer to FIG. 6. There are several information processing systems 1 shown in FIG. 6. The information processing system 1 may be an electrical product selected from the group consisting of a computer, a mobile phone, a personal digital assistant (PDA), a game machine, and combinations thereof which is equipped with Bluetooth transmission capability. Firstly, the Bluetooth mouse obtains the pairing code pairing with each information processing system 1 and stores the pairing code in the pairing information memory 24. The key unit 25 of the Bluetooth mouse includes a plurality of keys 251 and a mode-switching key 252. The user can press the mode-switching key 252 to trigger the signal processing circuit 23 to generate an object-switching signal to further initiate the above-mentioned linkage-switching mode. After the Bluetooth mouse is entered into the linkage-switching mode, if the Bluetooth mouse is moved rightward (as shown in FIG. 6), the Bluetooth mouse generates a corresponding displacement amount signal. The Bluetooth control unit 31 accesses a pairing code corresponding to the displacement amount signal from the pairing information memory 24 and links with an information processing system 1 according to the accessed pairing code. As shown in FIG. 6, the Bluetooth mouse is moved rightward to link with the rightmost computer, and then the control signal of the Bluetooth mouse is input to the rightmost computer. Refer to FIG. 7. If the user presses the mode-switching key 252 again and moves the Bluetooth mouse leftward, the Bluetooth control unit 31 will link with another information processing system 1 according to the accessed pairing code. As shown in FIG. 7, the Bluetooth mouse is moved leftward to link with the leftmost computer.

Figure 8:
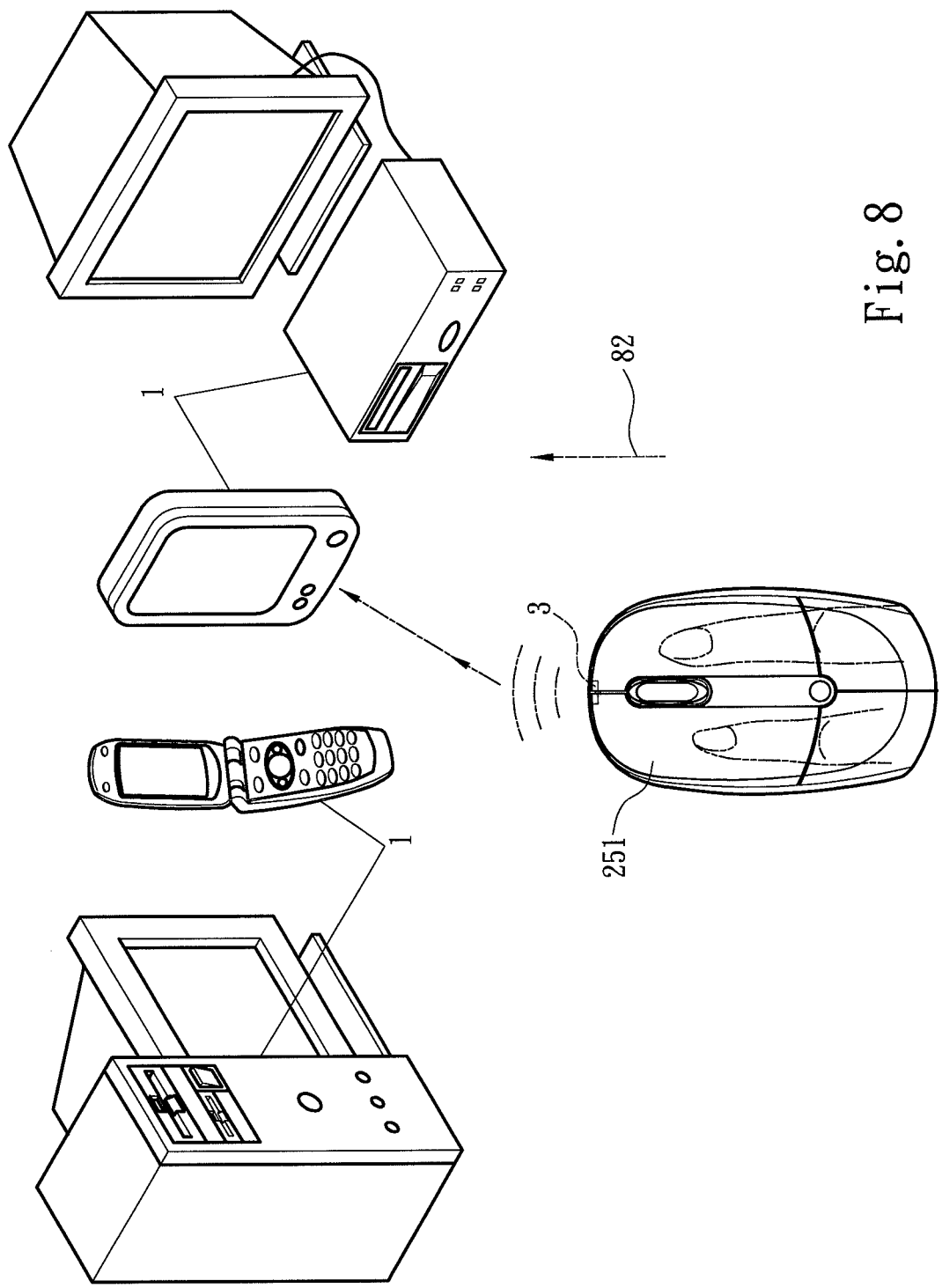
FIG. 8 is a schematic view showing a Bluetooth mouse for switching linking objects according to yet another embodiment of the present invention.

In the present invention, the Bluetooth mouse may be designed to generate the object-switching signal in another control method. Refer to FIG. 8. The key unit 25 of the Bluetooth mouse includes a plurality of keys 251, and the signal processing circuit 23 is designed to generate an object-switching signal when the user presses a key combination including at least two keys 251. Suppose that the Bluetooth mouse is programmed to enter the linkage-switching mode when two keys 251 are pressed, the user can move the Bluetooth mouse to choose a linking object.

The embodiments described above are only to exemplify the present invention but not to limit the scope of the present invention. Any equivalent modification or variation according to the scope of the present invention is to be also included within the scope of the present invention, which is based on the claims stated below.

The above description should have fully demonstrated that the present invention possesses utility, novelty and non-obviousness and meets the condition for a patent. Thus, the Inventor files the application for a patent. It is appreciated if the patent is approved fast.

What is claimed is:

1. A Bluetooth mouse for fast switching linking objects, the Bluetooth mouse comprising a signal processing circuit triggered by a key unit to generate a control signal according to a displacement amount of the Bluetooth mouse, the signal processing circuit being electrically connected with a Bluetooth transmission device; the Bluetooth mouse further comprising a pairing information memory storing pairing codes for establishing data transmission linkages between the Bluetooth transmission device and at least one information processing system, a displacement sensor and an analog/digital conversion circuit electrically connected with the displacement sensor, wherein the displacement sensor detects the displacement amount of the Bluetooth mouse, and the analog/digital conversion circuit converts the displacement amount into a displacement amount signal and sends the displacement amount signal to the signal processing circuit, the displacement amount signal is solely corresponding to one pairing code in the pairing information memory, and wherein the key unit is programmed one key or a combination of the keys to trigger the signal processing circuit to generate an object-switching signal, the Bluetooth transmission device is driven by the object-switching signal to obtain the displacement amount signal from the signal processing circuit and access one pairing code from the pairing information memory according to the displacement amount signal to establish a data transmission linkage with one information processing system corresponding to the paring code.

2. The Bluetooth mouse according to claim 1, wherein the displacement sensor is an optical sensor, a rolling sensor or an inertia sensor.

3. The Bluetooth mouse according to claim 1, wherein the Bluetooth mouse is moved on a plane which is divided into a plurality of displacement sections for generating different displacement amount signals.

4. The Bluetooth mouse according to claim 1, wherein the key unit includes a mode-switching key triggering the signal processing circuit to generate the object-switching signal.

5. The Bluetooth mouse according to claim 1, wherein the key unit includes at least two keys forming the combination pressed to trigger the signal processing circuit to generate the object-switching signal.

6. The Bluetooth mouse according to claim 1, wherein the Bluetooth transmission device is installed in the Bluetooth mouse.

7. The Bluetooth mouse according to claim 1, wherein the information processing system is an electrical product selected from the group consisting of a computer, a mobile phone, a personal digital assistant, a game machine and combinations thereof.

* * * * *